Fig. I

INVENTOR.
L. J. MOULTON

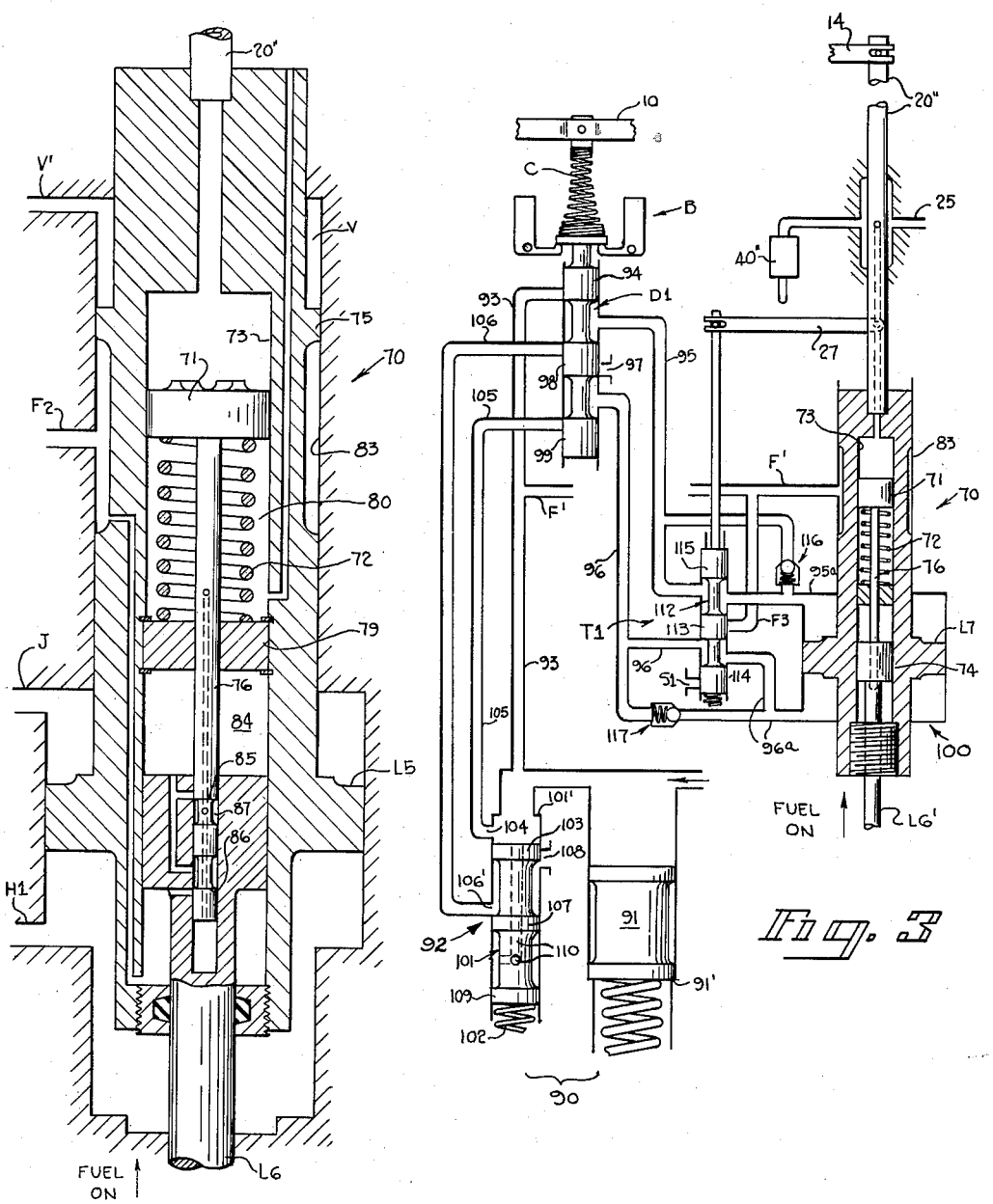

United States Patent Office 2,734,490
Patented Feb. 14, 1956

2,734,490

DUAL FUEL ENGINE CONTROL SYSTEM

Lloyd J. Moulton, Mentor, Ohio, assignor to The Marquette Metal Products Company, Cleveland, Ohio, a corporation of Ohio Application February 26, 1952, Serial No. 273,438

17 Claims. (Cl. 123—27)

The invention relates to an engine fuel regulating system and mechanism, and particularly to a hydraulic governor system arranged to supply a first or principal fuel to the engine so long as that fuel is available or effectual, and, in event of partial or complete failure of the principal fuel, to automatically supply to the engine a required amount of supplemental or substitute fuel. An important practical use of subject system as outlined above is to maintain operation of dual fuel internal combustion engines solely on the more readily available or economical one of two or more fuels (e. g. gas and oil), reserving the other, in case there are two fuels, for emergency operation. For illustration, the subject invention, indicating one of its objects, is shown arranged first to supply the engine with gas only (except for pilot oil to effect ignition) until gas pressure fails to carry the desired load whereupon automatic conversion to oil occurs in proportion to the amount of gas pressure failure, followed automatically by reconversion to gas when or if its pressure is restored. The functions (and the objects hereof in general) are those set forth and described in L. J. Moulton Patent 2,690,167 issued September 28, 1954, entitled Dual Fuel Engine Control System (automatic engine load and speed control under various conditions incident to fuel conversion and reconversion). Attention is also called to application of L. J. Moulton, Serial No. 273,439, filed February 26, 1952, entitled Dual Fuel Engine Control System.

Additionally the present invention, indicating further objects, provides an improved accumulator and valving arrangement for supplying hydraulic relay governors and auxiliary hydraulic equipment thereof with operating fluid; a simplified mechanism for modifying the governor speed setting as a function of first or principal fuel fluctuations; an amplifier or relay mechanism adapted to detect, for example, gas fuel pressure variations of small magnitude and to translate such variations into relatively strong but proportional force variations for control purposes, said amplifier, among other uses, enabling the gas pressure fluctuations to be detected close to the point or region of introduction of gas to the engine and causing amplified functions of such fluctuations to be transmitted hydraulically to the governor mechanism for purposes of load and/or speed control.

A further specific object is to provide a dual fuel hydraulic governor the fuel-controlling servomotor or power piston mechanism of which has hydraulically operated relatively movable parts, one adapted to be connected to the engine fuel feeding apparatus to effect fuel selection and/or metering of fuel through known or suitable fuel linkage arrangements and the other being actuated by fuel-failure-responsive means and being operatingly connected to a permanent speed droop mechanism of the governor in a manner to preserve automatically desired speed/load relationships or regulation in carrying rated loads regardless of which fuel is caused to be used and even when both fuels are being used.

Other objects and features of the present invention will become apparent from the following description of typical arrangements, all schematically shown.

In the drawings, Fig. 1 is a diagram showing a dual fuel hydraulic relay governor system employing a single servomotor or power piston, different portions of the stroke of which actively control respective fuel feeding means.

Fig. 2a is a central sectional view of a speed regulating servomotor or power piston incorporating a power head, the construction illustrating an alternative for the servomotor mechanism of Fig. 2.

Fig. 3 is a partial diagram showing a dual fuel governor with a form of accumulator and valving adapted to cooperate with a different type of servomotor than is shown by the other views.

Fig. 1 mechanism

Figure 1:
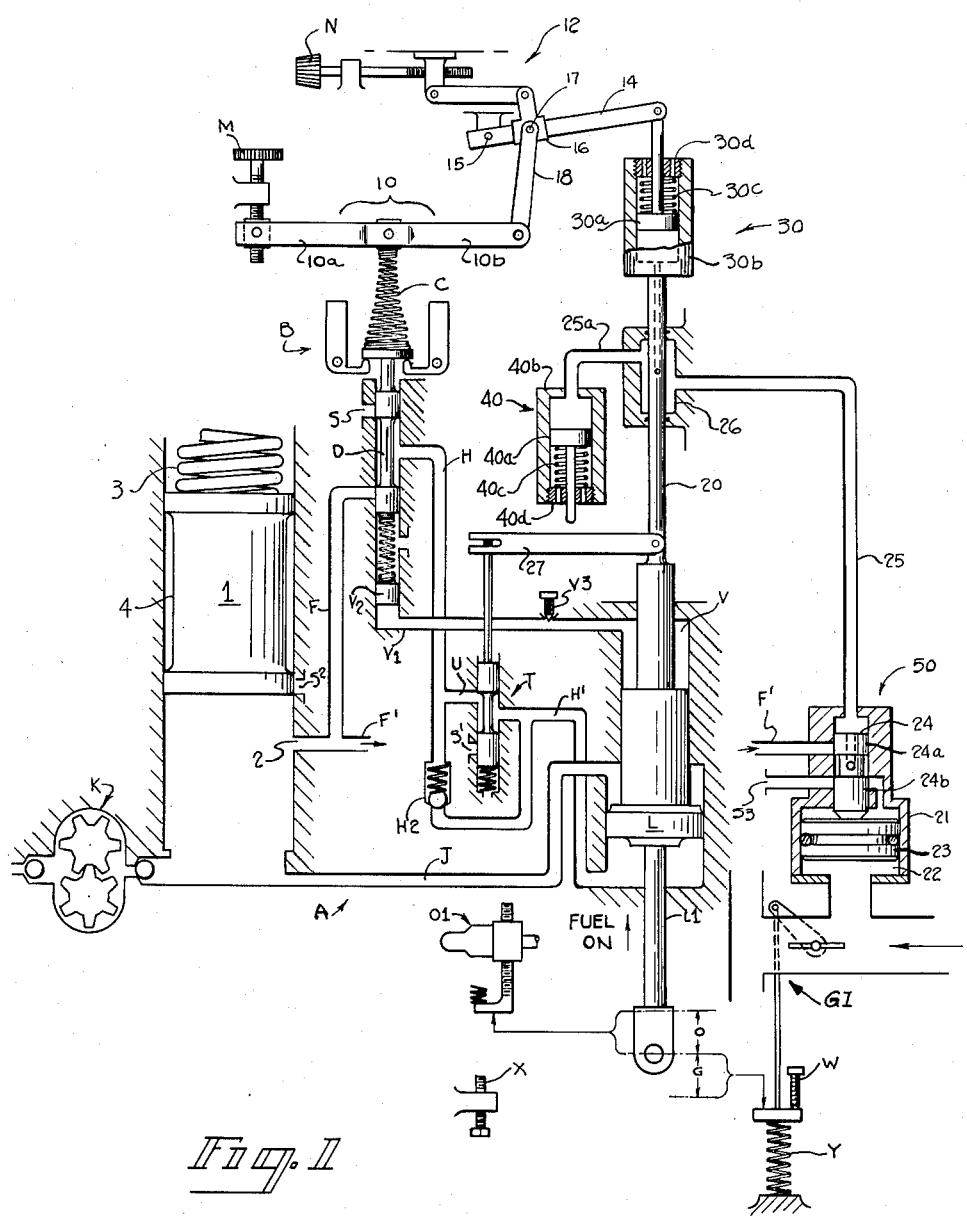

The hydraulic relay governor mechanism A, as shown in Fig. 1, has an engine-speed-change-detecting mechanism B including flyballs, a speeder spring C and a pilot valve D. The pilot valve controls the operating effect of substantially constant pressure fluid (governor oil supplied through lines F and J) on a servomotor, represented by power piston L. Passages H and H1 between the pilot valve and servomotor are normally interconnected. Governor oil, in the illustrated equilibrium or steady-state position of the pilot valve is trapped in contact with relatively larger area (lower face) of the power piston L whose smaller (upper face) is continually subjected to governor oil pressure through line J.

To cause "fuel-on" (upward) movement of the power piston L the pilot valve D (by lowering, as in response to diminished engine speed) admits governor oil to lower cylinder chamber of the power piston and, to cause "fuel-off" or reverse piston movement, the pilot valve is raised and then spills oil at pilot valve sump connection S.

Valve T connecting oil lines H and H1 (used for emergency shutdown and load limiting purposes as will be described) is operated principally as a function of governor servomotor motion to cause spill of oil from the lower power piston cylinder chamber through sump-connected port S1 after cutting off line H at port U. A one-way spring loaded valve H2 is shown in by-passing relationship to valve T so that the governor can always control fuel-off movement of the power piston.

A hydraulically acting feedback (temporary speed droop) system between the governor power piston L and its pilot valve D is diagrammatically represented as comprising an actuating displacement chamber V; oil passage V1; receiving piston V2 which is spring-connected to the pilot valve, and a needle valve V3 for adjusting leak-off. The system is substantially that of A. Kalin Patent 2,219,229, dated October 22, 1940.

The servomotor or power piston L, as shown in Fig. 1 (also Figs. 2 and 2a) is that referred to as a "differential type" servomotor, namely one having relatively large and small piston areas and requiring only spill of fluid from a large-area-connected passage in order to effect piston movement in one direction, e. g. fuel-off movement. The accumulator and valving system shown in Fig. 1 is appropriate for operation with such differential type servomotor. The governor oil supply system includes a power-operated pump K in the governor casing or otherwise, the output of the pump being maintained in contact with the engine-fuel-reducing, smaller area, side of power piston L at commencement of governor operation, by oil storage action of an accumulator piston 1, until sufficient output pressure has been built up in the accumulator so that shutdown operation, in event of almost any temporary emergency, is assured. As accumulator pressure rises the piston is forced upwardly against its spring 3 and a lower valving land 1a of the piston uncovers a port 2 leading to pilot-valve-connected line F. The accumulator piston 1 thus establishes a governor oil pressure threshold, i. e. prevents supplying of oil to the power piston through the pilot valve for fuel-on-power piston movement until a substantial volume of pump output oil has been accumulated. Such accumulator action, incidentally, assures that engine operation under governor control cannot commence until the power piston L is in minimum-fuel-supplying position.

If for any reason during governor operation the governor oil supply happens to become depleted at a time when fuel reduction (shutdown or normal governor action) is required (as through leakage, pump derangement or governor-oil use by a considerable amount of auxiliary hydraulic equipment), the accumulator piston 1, by closing port 2, assures that no further governor oil can be used for fuel-on power piston movement and then, through the action of accumulator capacity spring means 3 (assuming sufficient accumulator capacity), assures fuel-off power piston operation. The accumulator piston 1 is relieved at 4 between its lower and upper lands for spill of fluid from the regulating oil passages (if then connected by governor action with passage F) at sump-connected port S2. Thereby, for example, as the engine slows down and passages F and H are thereby connected through governor pilot valve action, the oil beneath power piston L can escape to permit complete fuel-off piston stroke to take place.

Figure 2:
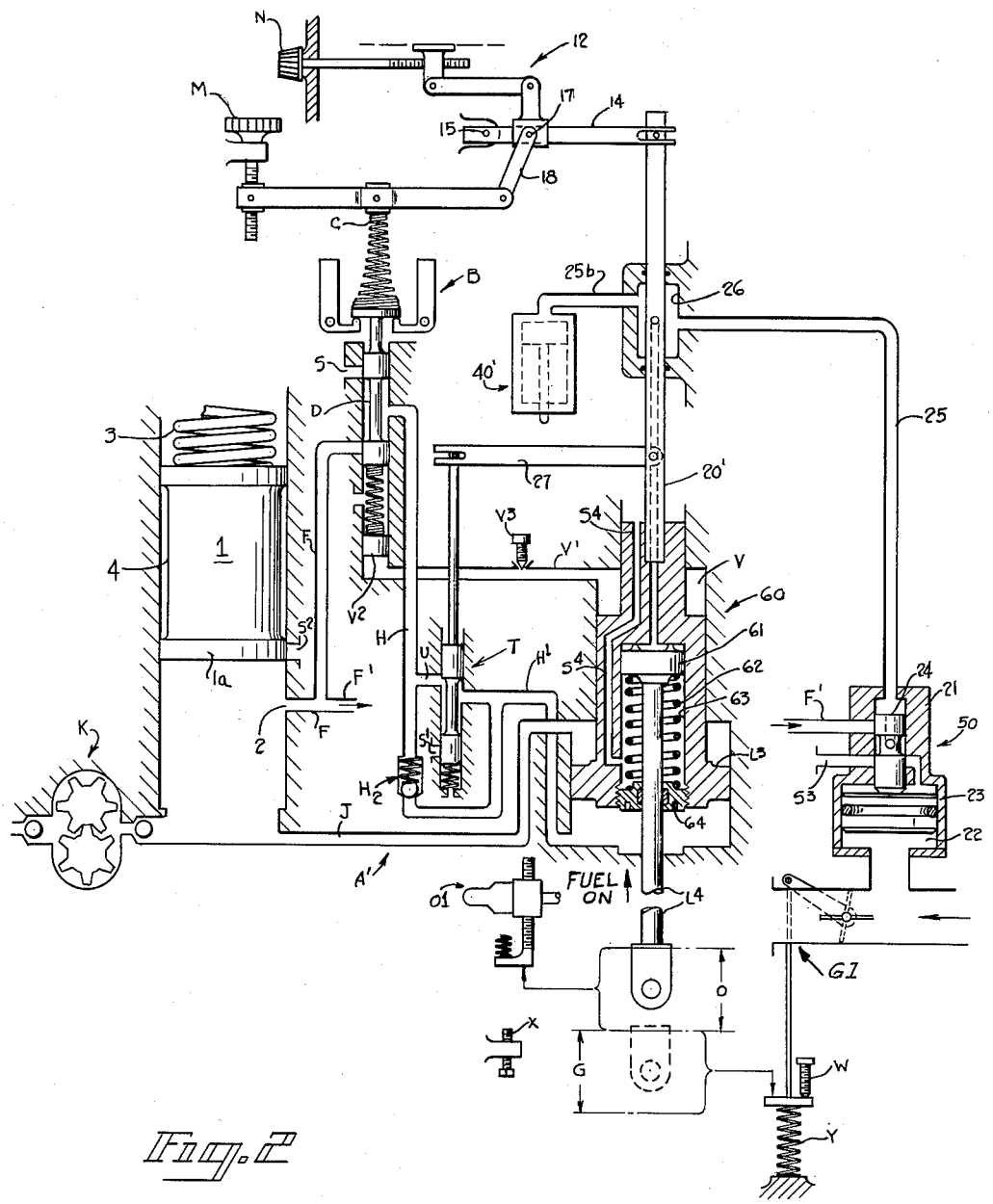
Fig. 2 is a diagram showing a similar dual fuel governor arrangement but wherein the full servomotor or power piston stroke is made available to control each of the two fuels.

The same valving accumulator arrangement as just described is shown also in connection with Fig. 2 and the parts are similarly numbered. The accumulator arrangements according to Figs. 1 and 2 can be modified to include a general feature shown by Fig. 3, namely the use of one relatively small, hence, inexpensive, piston valve member, as will be described, to control output pressure and to accomplish the necessary valving operations.

The linkage connecting the power piston L, Fig. 1, to the gas valve G1 and to the oil injectors (one represented at O1) varies in design according to specific use requirements. With the illustrated linkage arrangement, operating rod L1 of the piston has moved through the gas feeding range G, enabling spring Y to move the gas valve G1 to fully open position.

If a threshold pressure of the gas supply to the engine is established, by means not shown (gas supply cut off when the pressure falls to a critical value), then it is desirable that the power piston L, assuming gas failure has taken place, shall, after opening valve G1 to its illustrated position, partially re-close the valve as the piston moves out of gas control range G into oil control range O. Thereby in event of restoration of gas at threshold pressure, while the engine is operating wholly on oil, the incoming gas will be somewhat throttled and will not tend to overload the engine before the power piston has had time to be moved out of the oil range O by subject mechanism as will be described.

On the other hand if, in order to enable full use of all available gas (as by concurrent use of oil and gas at relatively low gas pressure) no pressure-threshold-establishing means or a very low threshold is provided, it is then desirable to allow the gas valve G1 to remain fully open as the power piston moves into the oil range. In that case an adjustable gas valve stop, such for example as shown at W in Fig. 1, blocks spring Y of the gas control linkage from further valve adjusting operation as the power piston moves into its oil range O from the illustrated piston position.

Oil fuel pilot stop X insures sufficient oil injection for ignition while the power piston is in its gas range G. It is assumed that ranges G and O are of equal length for full load travel of the power piston exclusively on gas and oil respectively so that power piston operation in each range, from zero fuel to full fuel, will have equal effect on a speed droop linkage 12 described below. In dual fuel engines for general service the operation on oil is taken as the standard on the basis of which the gas feeding mechanism is designed.

The governor A as shown, has a well known type of speed setting mechanism including a lever 10 connected between its end to the speeder spring C. End portion 10a of the lever is subject to speed setting operation as by a hand knob M or suitable power means not shown. End portion 10b has a fulcrum which is movable by governor power piston action for modifying the speed setting according to load as reflected by power piston position, that being the essential action of a conventional permanent speed droop linkage customarily employed in hydraulic relay governors.

Speed droop linkage 12, as shown, includes a lever 14 supported on a fixed pivot 15 and a block 16 slidable along the lever and carrying a movable pivot 17 connecting a link 18 to speeder lever end portion 10b. The free end of lever 14 is connected through a hydraulically operated slave motor 30 of a gas pressure responsive relay mechanism 50 (to be described) to the power piston L as by means of piston tailrod 20, so as to be raised and lowered progressively by power piston action. Movement of the slide block 16 as by speed droop adjustment knob N connected therewith changes the distance between pivots 15 and 17 and thereby varies the amount of speed-setting-modification or speed droop from zero (pivots 15 and 17 aligned) to any desired value.

When, for example, a dual fuel, hydraulic relay governor unit has different portions of its power piston stroke allocated to the feeding of respective fuels, and engine speed stabilization is accomplished by an adjustable permanent speed droop linkage or equivalent means functionally similar to that illustrated herewith (mechanism 12), and automatic resetting of speed as a function of first-fuel-failure is desirable when converting from one fuel to another. Otherwise the speed prevailing prior to failure of the first-used fuel will not, unless reset manually, be maintained during operation on the second fuel. Also in such a governor unit it is desirable in order to prevent overloading of the engine by concurrent use of two fuels (as in event of failure of the first fuel followed by restoration thereof) to provide for automatically limiting the power piston stroke, particularly in its second-fuel-feeding range, as a function of first fuel failure. Fluid operated mechanisms 30 and 40 of the gas-pressure-responsive relay 50 are caused respectively to effect the necessary automatic speed resetting and load limiting operations.

The speed resetting and/or load limiting operations briefly outlined above can be effected by motor devices directly operated by variations in gas pressure (in case the first used fuel is gas) which is the arrangement shown and described in said Moulton patent. As herein arranged said operations are accomplished through the intermediary of the gas-pressure-sensitive relay or amplifier 50 which is shown in the form of a pressure regulator mechanism arranged to supply the slave motors 30 and 40 with hydraulic fluid (oil) at pressures varying with and proportional to the regulated gas pressure but considerably thereabove. Accurately adjusted oil pressure to the slave motors is maintained despite leakage. The illustrated arrangement enables application of positively acting and quickly responsive control forces of adequate magnitude for speed resetting and/or load limiting; enables the slave motor units to be of small size hence more readily adaptable for mounting within or on conventional governor casings than gas-pressure-responsive (e. g. diaphragm type) motor devices usually are; avoids having to conduct combustible gas to the governor mechanism itself, thereby tending toward greater safety of operation and reduction of maintenance problems, and, because of the greater compactness and adaptability of location of the hydraulic slave motors as compared to direct-gas-operated counterparts, enables practical use of a greater number of individual purpose slave motor units in already existing governor casings, usually without redesign or increase in size thereof.

The pressure regulator of mechanism 50 includes, as shown, a suitable body 21 having a gas-receiving chamber 22 connected to the engine gas supply ahead of the control valve G1 with respect to the direction of feeding of gas to the engine manifold. A piston 23 (or a diaphragm not shown) within the gas chamber 22 transmits the (usually regulated) gas pressure force to a hydraulic pressure regulator piston valve 24 which is slidable in a mating bore of the body 21. The body 21 has a connection, shown as passage F1, with the governor accumulator 1—4 as a source of approximately constant oil pressure, a spill outlet S3 to governor sump, and a controlled or regulated pressure output connection 25 to slave motor units 30 and 40. Pressure output line 25, as shown, leads to an oil pickup chamber 26 in the governor case through whose defining walls the piston tail rod 20 slides, oil being thereby conducted to the pressure space of slave motor 30 via tail rod drillings as will be evident. Motor 40, as shown, is supplied with operating oil through line portion 25a connected with the pickup chamber 26.

The upper and lower lands 24a and 24b of the oil pressure regulator piston valve 24 normally just close the ports leading to supply and spill connections F1 and S3 respectively, and the space between the two lands is open to output line 25 through suitable drillings in the piston valve.

The slave motors 30 and 40 are operatively identical, and, for clearness of illustration, their size relative to the other mechanisms is exaggerated. Each slave motor has a piston (30a, 40a); cylinder (30b, 40b); position-determining spring (30c, 40c), and a spring-force-adjusting device (sleeve nuts 30d, 40d). A fixed position in or on the governor case for the cylinder of slave motor 40 is assumed.

For gas-pressure-failure-responsive load limiting, the operating stem of slave motor 40, as shown, is arranged to serve as a variable fulcrum for lever 27 connected, as at its opposite ends, to the governor load limiting valve T and to the governor power piston L. Load limiting operation of the valve T (already generally explained) is primarily a function of power piston movement in the fuel-on direction, the exact point at which a fuel-on motion of power piston L is arrested by operation of valve T thus depending upon the position then occupied by the slave motor piston 40a, as will be evident from the drawing.

Usually a manually or otherwise adjustable load limiting and engine shutdown fulcrum (not shown in Fig. 1) is also operatingly associated with lever 27.

Practically ideal speed-resetting or speeder spring force modifying action of the slave motor 30, through speed droop linkage 12 (assuming a threshold gas pressure and a linkage design requiring full power piston stroke in range G in order to carry full engine load on gas) requires that the oil range O for full load operation solely on oil be of the same length as range G and that the travel of piston 30a in its cylinder from the illustrated relative position of parts to one in which piston 30a abuts the cylinder end or other stop, is also equal in length to each range G and O. Thereby, during a complete conversion from gas to oil, the original speed setting is restored by gas-failure-responsive movement of piston 30a to its stop, and subsequent fuel-on movement in range O will progressively produce the same speed droop action per unit of movement as resulted from gas operation. Reconversion to gas is also accompanied by appropriate resetting of speed but in the reverse direction.

The above described speed-resetting operation can be attained by appropriate rate selection and initial force or loading adjustment for piston spring 30c. For example, with the piston in cylinder-bottoming position the sleeve nut 30d is so adjusted that the force of the spring on slave piston 30a is equal to the effective residual manifold gas pressure, acting through the oil column maintained by relay mechanism 50, on the opposite side of the slave piston. The rate of spring 30c is so selected that, when the piston 30a has performed its full speed-reset stroke (as when the gas pressure rises from residual manifold pressure to that enabling full load engine operation on gas with fully open throttle valve) the spring force on piston 30a equals the effective opposing gas pressure force on said piston through the oil column maintained by mechanism 50. In the design of slave motor 30 and its spring 30c the design of governor speeder spring C and the speed droop linkage should be taken into account since the speeder spring, through said linkage, also acts on piston 30a subtracting from the effective force of spring 30c on the piston different amounts with different speed settings.

For extreme accuracy of reproduction of speed droop operation over the entire operating speed range of the governor the addition of a hydraulic power head (typical one shown in Fig. 2a in the assembly 70 thereof) is desirable. In such construction piston 30a operating against spring 30c would position the power head pilot valve only (part corresponding to valve plunger 76, Fig. 2a, described later), the power head piston (cf. 74, Fig. 2a), in turn, positioning speed droop link 14.

Accurate load limiting operation of slave motor 40 aequires spring rate selection, total stroke and initial spring force adjustment such that, at residual manifold gas pressure, as detected by mechanism 50, the operating stem of piston 40a is always out of power-piston-arresting position in relation to lever 27 of valve T at the instant the power piston commences its movement in oil range O. The rate of the spring 40c is so selected that, at a manifold gas pressure capable of enabling the engine barely to carry full load on gas with wide open throttle, the stem of piston 40a will be ready to act to limit power piston movement to the gas range G. The allowable stroke of piston 40a is such that should the gas pressure, through derangement of its regulating means or from other cause, rise to a value such as could endanger the engine by overloading it in the gas range G, such overloading would be prevented by abnormal further movement of piston 40a.

Further assuming that the first used fuel is gas; that the type of engine served by the governor is such that no critical (threshold) pressure is required for safe engine operation, and concomitantly, that it is desired to use gas at any available pressure below regulated pressure (as might result from a partial failure), supplementing the gas with oil only when required in order to carry the operating load, it will be apparent that, for automatic operation, the engine speed requires resetting in proportion to the amount of gas failure since the power piston L will have a different position in range O representative of any given load when oil is used to supplement partially failing gas than when oil is the only fuel being used.

Speed control in event of partial gas failure (assuming such an arrangement as will enable use of all available gas) may be illustrated for example by a 50% gas failure at full load (i. e. half normal pressure or half the pressure at which rated load can be carried with the power piston at the top of its range G). In such case the power piston L goes approximately half way into the range O and the valve G1 remains fully open (stop W rendered effective to prevent partial closing of valve G1 as the power piston goes beyond range G). Since the piston 30a of slave motor 30, at 50% gas failure, moves downwardly the same distance as the power piston was described as moving upwardly into range O as a result of that failure, the amount of speed droop or speed resetting action during ensuing engine operation will be the same as was the case when the power piston moved to full fuel position (top of range G) in carrying full load solely on gas. Concomitantly the slave motor 40, in event of a 50% gas failure, operates to limit the power piston to approximately one half its stroke in the oil range O.

If, for further example, a 50% gas failure occurs during operation on 50% load, the power piston, through normal governor action, moves approximately to the top of its G range in order to carry the 50% load, and the speed droop action (through mechanism 12), by reason of the 50% gas-failure-responsive motion of slave motor piston 30a, will now be the same as when 50% load was previously carried at normal gas pressure. Any other partial gas failure, assuming an operating load that can be carried solely through use of gas, has a speed resetting action which is proportional to the amount of failure.

An "engine-operating-capability characteristic" of an engine fuel, as that expression is used herein, means any characteristic of the fuel which may be variable and which for a given value of that characteristic, all other engine affecting variables being fixed, determines the load which the engine is capable of carrying.

*Fig. 2 mechanism*

The governor arrangement A' according to Fig. 2 is generally the same as that already described and the same characters as used in Fig. 1 are applied insofar as the elements of the two arrangements are operatively or functionally identical.

Fig. 2 differs from Fig. 1 mainly in that, in lieu of having to use separate hence relatively short length portions of the power piston stroke to control respective fuels (thus limiting the work capacity) the power piston assembly includes an automatic effective-position-resetting means operating as a function of first fuel failure (and/or restoration) in a manner enabling full distance movement of the power piston to be utilized for control of each fuel. The gas pressure sensitive relay output element (counterpart of motor 30) is differently located, as compared to Fig. 1, between the power piston fuel control element (control rod) and the speed droop mechanism 12.

In the Fig. 2 arrangement, because the power piston fuel control rod can only move into the oil range a distance proportional to the amount of failure of the gas to carry the operating load there is never any possibility of overloading the engine by concurrent use of gas and oil. During any operation solely on oil, after gas failure, either a partial or complete restoration of the gas has the immediate and direct effect, through automatic operation of the power piston assembly, of reducing in proportion to the amount of gas restoration the quantity of oil which can be used. Thus no gas pressure failure responsive load limiting slave motor 40 or equivalent mechanism has to be used in the Fig. 2 version. Relay output motor 40', supplied with regulated pressure oil through passage 25b, is nevertheless useful in the Fig. 2 arrangement to safeguard the engine against malfunctioning of the gas pressure regulator equipment or inexperienced adjustment of it such, in either case, as could enable overloading during operation of the engine solely on gas.

The oil-pickup chamber 26 in Fig. 2 supplies output oil of gas-pressure-responsive relay mechanism 50 to a slave motor mechanism 60 shown as built into the power piston L3 and comprising piston 61 and reactance spring 62 in an axial bore 63 of the power piston. The lower end of spring 62 is supported by a sealing thimble or annular plug 64 around the control rod L4. The space between the thimble 64 and piston 61 is suitably vented to sump as by a passage S4 in the power piston.

The thimble or plug 64 of mechanism 60, as shown is adjustably mounted (threaded) in the power piston L3, hence it could serve to enable variation of the loading on spring 62. However, when the reactance spring (corresponding to 62) is in a relatively inaccessible position cf. Fig. 2a and Fig. 3), then it is recommended that the gas pressure amplifying relay mechanism 50 be so constructed as to enable the equivalent of reactance spring loading adjustment. For example counterparts of the piston 23 and piston valve 24 may occupy laterally spaced apart parallel bores in a suitable housing (not shown), be arranged for relatively opposite axial movement, and be connected by a lever having a fulcrum which is adjustable in a direction to vary the relative length of its effective lever arms. Shifting of the fulcrum as from a midposition toward the pressure regulating piston valve would raise the relay output oil pressure for a given gas pressure which would be the equivalent of decreasing the loading of spring 62 of piston 61 of Fig. 2.

The stem L4 of piston 61 forms the fuel control rod of power piston L3, and, generally as in the previously described construction, the fuel-control-connected free end portion of the rod operates in a range G variably to position gas throttle valve G1 and in a range O to control the oil fuel. As described in connection with the fuel control linkage of Fig. 1 and for the same purpose the gas throttle valve G1 of Fig. 2 is capable of being blocked in fully open position as by stop W at the top of gas range G or can be arranged to permit it to partially re-close during power piston movement in range O.

The reactance spring 62 slave motor piston 61 has to be stiff enough to be certain to transmit, without excessive continuing deflection, the fuel feeding motion of the power piston to the fuel linkage. In other words, the spring must be so related to power piston capacity rating as not to yield appreciably when the power piston is exerting its normal operating force. Spring rate selection and initial spring force adjustment in relation to effective gas pressure on piston 61 (through pressure multiplying relay mechanism 50) are determined by the same basic considerations as already described in respect to slave motor 30, Fig. 1. The speeder spring does not have to be taken into account in the design and selection of spring 62, but springs in the fuel control linkage externally of the governor may have to be considered. Since the hydraulic output force of pressure multiplying relay mechanism 50 does not have to bear any particular relationship to input (gas pressure) force, sufficient operating power for the pistons of slave motors 30, 40 and 60 is potentially available through suitable design so that the relatively small disturbing or conflicting forces can frequently if not usually be ignored.

The piston 61, at minimum operating gas pressure, is in its illustrated position; and due to the spring design and loading the piston is moved in response to rise in regulated pressure value, through a distance exactly corresponding to the stroke of the power piston in going from no load to full load position on oil.

In the operation of the governor mechanism according to Fig. 2 the effective force of gas at regulated pressure, acting on piston 61 through mechanism 50 initially maintains the working end of power piston fuel control rod L4 within range G. A diminution of gas pressure enables a proportional lifting of the piston 61 by its spring 62 relative to power piston L3 so that the control rod can move a corresponding distance into the oil range (partial conversion). If the gas pressure drops to the working minimum established by equipment design (for instance to a predetermined threshold pressure) piston 61 moves to the illustrated upper-stop-engaging position in the power piston and then subsequent operation thereof, until return of threshold pressure of the gas, is limited to oil range O (complete conversion).

The position of the power piston L3 relative to its cylinder is unaffected by the necessary fuel conversion motions of gas-pressure-responsive piston 61 relative to the power piston, hence the speed droop action of the power piston through tail rod 20' and linkage 12 is unaffected by fuel conversion action. In order for the speed setting to remain unchanged during conversion from one fuel to the other the gas fuel system must be designed with relation to the oil fuel system so that for a full fuel position of the power piston the control rod L4 will supply either or both fuels in quantity adequate to carry full engine load for each control rod position during conversion.

*Fig. 2a mechanism*

As mentioned above the design (selection and adjustment) of the spring 62 of power piston mechanism 60 of Fig. 2 must take into account any substantial modifying action of springs, friction, etc. in the control linkage and must be stiff enough to insure prompt fuel-control-linkage-operating movement of rod L4 in response to the movements of power piston L3. The power head and servo mechanism 70 of Fig. 2a is recommended as an alternative for the Fig. 2 arrangement whenever extremely accurate fuel control is necessary or advisable or in event lag due to friction in the control linkage must be avoided or it is difficult to ascertain spring and other forces involved in the linkage prior to design and assembly of the governor.

Referring further to Fig. 2a the power piston L5 is fluid-connected for governor-operation exactly as in the case of pistons L and L3, previously described, and a chamber bore 73 in the power piston is supplied, as at its upper end, with oil at pressures proportional to engine manifold gas pressure, e. g. from gas-pressure-responsive relay mechanism 50, oil pickup chamber 26 (not shown in Fig. 2a) and hollow tailrod 20" which is assumed to be connected to a speed droop mechanism such as 12.

Piston 71 in chamber-forming bore 73 corresponds generally to fuel-control-rod-positioning piston 61 of Fig. 2, but, in Fig. 2a, the control rod L6 has a differential type power head piston 74 attached to it, for operation in a suitable bore 73' which preferably is part of bore 73 (same diameter). Movement of piston 71 controls the position of power head piston 74 through a pilot valve plunger 76 which can be designed to have almost no resistance to valving movement. Reactance spring 72 of piston 71, functionally corresponding to spring 62 of Fig. 2, is supported by a wall member 79 which is detachably fixed in the bore 73, 73' as by snap rings and defines part of a suitably vented chamber 80 around the spring. The stem of the pilot valve plunger 76 slides freely in a mating opening in wall member 79 and in its valve bore in the power head piston.

The lower, smaller area, side of power head piston 74 is subjected to governor oil or accumulator pressure in chamber 81 which is shown as connected to a pickup chamber 83 around the power piston trunk portion 75, which chamber is connected, for example, at F2 to a branch of pressure oil line F1 (see Fig. 2). The larger area, top, side of the power head piston is normally subjected to trapped oil in chamber 84. Valving edges 85 and 86 of the power head pilot valve plunger 76 control respective ports leading to the chambers 84 and 81, respectively so that, pursuant to actuation by piston 71, downward motion of the pilot valve plunger connects chambers 81 and 84 for downward power head piston movement and upward motion of the plunger spills trapped oil from chamber 84 to the vented spring-containing space 80 with which pilot valve chamber 87 may be connected through suitable axial and cross drillings in the valve plunger. The plunger clearance space 80' below the pilot valve plunger, as shown, is similarly vented through space 80.

The illustrated position of power piston L5, Fig. 2a, is at approximately mid stroke, thus corresponding to the position in which the main piston L3 of Fig. 2 is shown. The total stroke length of power head piston 74 in its working chamber is assumed to be the same as the total power piston stroke length, and said power head piston is shown about in mid position, indicating that engine manifold gas pressure is half its normal value. Thus the relative position of elements shown in Fig. 2a represents the carrying of full load of 50% gas (control rod at top of range G).

Since the speed resetting and load control action in the case of Fig. 2a is independent of control rod position (same as with the Fig. 2 arrangement) the operation in respect to speed and load is as already described in connection with Fig. 2.

*Fig. 3 mechanism*

In Fig. 3 the operating fluid accumulator mechanism 90, the functional features of which are generally the same as those already described, is especially arranged to serve a governor power piston or servomotor mechanism such as shown at 100 which, for movement of the piston in opposite directions has its fluid connections (supply and exhaust) reversed by appropriate valving in respect to relatively opposite and usually identical piston faces. Such servomotor mechanism has been hereinbefore referred to as a "double acting" type servomotor as distinguished from the "differential type" described in connection with Figs. 1, 2 and 2a. Further the accumulator mechanism 90 of Fig. 3 is so arranged that capacity-affording portions may comprise simple spring loaded pistons (one shown at 91) in approximately interconnected cylinders none of which pistons 91 has to control spill or effect any other fluid valving. Those purposes, according to Fig. 3 are served by a relatively small diameter, hence inexpensive, piston valve mechanism 92. The power piston mechanism 100 of Fig. 3 is adapted to operate with full work capacity in controlling the respective fuels (cf. Fig. 2), and the mechanism, as shown, includes the power head feature of Fig. 2a (parts numbered as in that view) which as already noted is operatively interchangeable with the somewhat simpler servomotor arrangement of Fig. 2.

The accumulator piston 91 of Fig. 3, as by spring-resisted movement to a suitable stop 91', principally determines the working volume or capacity of the accumulator system. Accumulator output line 93 leads to the governor pilot valve whose plunger D1, by upward movement of its land portion 94, subjects the top face of the power piston L7 to governor oil pressure through line 95, 95a for fuel-off or downward movement of the piston. Meanwhile exhaust fluid from the lower power piston chamber leaves by way of line 96a, 96 through sump port 97 of the pilot valve which port is then unblocked by a middle pilot valve plunger land 98.

When the required threshold pressure has been built up in the accumulator the piston valve 101 of mechanism 90 has been moved against its spring 102 by such pressure into the illustrated position wherein an end land 103 on the piston valve unblocks a port 104 of line 105 leading to the pilot valve. That line, as shown, is blocked at the pilot valve by a land 99 thereof.

With the piston valve 101 in its illustrated normal working position as just described, an exhaust line portion 106 (normally blocked at the pilot valve by its middle land 98) can, by downward pilot valve movement, be communicated with the line 95 leading from the upper chamber of the power piston. The exhaust line portion 106 for that chamber communicates (through a piston valve chamber formed or provided between the land 103 of the piston valve, a middle land 107 thereof and the piston valve bore) with sump-connected port 108. Port 108 also serves the piston valve plunger 101 for accumulator working-pressure-limiting or controlling spill. Thus after the building up of an adequate supply of accumulator oil, when the governor pilot valve plunger (see land 99) moves downwardly it causes communication of lower-power-piston-chamber-connected line 96 and accumulator-connected line 105 to produce fuel-on power piston movement, and concurrently that movement is permitted by exhaust-affording connection of lines 95 and 106 with the upper chamber of the power piston (through lowering of middle pilot valve land 98).

Prior to accumulation of sufficient pressure oil for continued governor operation and the supplying of the gas pressure relay devices (e. g. when the piston valve 101 is resting on its stop 101′) line 105 is vented around a necked portion of the piston valve to spill port 108; and line 106, which can by downward pilot valve movement be connected to the top chamber of the power piston, is connected to the supply chamber of the accumulator mechanism. In the illustrated arrangement the piston valve land 107 would at such time as just mentioned be above port 106′, and the chamber formed around the piston valve between lands 107 and 109 would be connected to the accumulator through drillings 110 in the piston valve. Thereby, as with the accumulator arrangement of Figs. 1 and 2, if flyball and pilot valve mechanism B, C, D1 attempts to cause premature fuel-on movement of the power piston L7 that action is delayed until the accumulator has established a predetermined pressure and capacity. Fuel-on movement can commence as soon as ports 104 and 106′ are opened by lowering movement of piston valve lands 103 and 107 during downward movement of the piston valve to its illustrated position.

The load-limiting valve mechanism T1 of Fig. 3, the plunger 112 of which is connected to lever 27 for power piston actuation under control of slave motor 40′ etc. (as before), requires special provision for supplying the upper power piston chamber with governor oil when the mechanism T1 vents fluid from the lower power piston chamber. Supply is afforded, as shown, by a branch F3 of oil line F′ which, at valve T1, is normally closed by middle plunger land 113. Fluid routing through valve mechanism T1 for normal power piston action in opposite directions will be evident from inspection of Fig. 3. The middle land 113 of valve plunger 112 closes supply line 96 immediately before the lower plunger land 114 spills lower power piston chamber oil from passage 96a to sump-connected port S′. Governor-pilot-valve-connected line 95 is closed by the uppermost land 115 of plunger 112 after an alternate supply of governor oil for the upper power piston chamber is established by lowering of middle plunger land 113 into unblocking relationship to branch line F3. To enable supply and exhaust for the upper and lower power piston chambers respectively under governor pilot valve control at all times appropriate one-way spring loaded valves 116 and 117 by-pass the mechanism T1.

I claim:

1. In a dual fuel engine speed governor having a governor power output motor member and engine speed responsive means for controlling it, mechanism connected to the motor member for operation thereby and having an output element which is movable relative to the motor member, in the direction of operation of the motor member, into and out of two separate motor-member-imparted ranges of movement for enabling successive operation by said element on metering means for two different fuels, and means responsive to fluctuations in a variable engine-operating condition of one of the fuels and operatingly connected to said mechanism to effect movement of its output element out of one range and into the other range distances generally proportional to the amount of fuel condition fluctuation.

2. The combination according to claim 1, wherein the fuel which is subject to engine operating condition fluctuations is gas, the said output element of the motor member is arranged to be actuated by hydraulic fluid, and the fuel condition responsive means includes a hydraulic fluid pressure regulator valve mechanism arranged to vary the hydraulic fluid pressure acting on said output element proportionally to gas fuel pressure variations.

3. The combination according to claim 2, further characterized in that said motor output element comprises a two-way-operating hydraulic motor unit, with means to supply operating fluid thereto from an approximately constant pressure source, a follow-up pilot valve on said unit arranged to control the constant pressure fluid for operating the unit, and a hydraulically actuated device operatingly connected to the pilot valve and arranged to be operated upon by the hydraulic fluid output of the pressure regulator valve mechanism.

4. A dual fuel engine speed governor for operating, successively, a metering means of a first used fuel and a metering means of a second used fuel, which two means have governor output motion receiving portions designed for approximately equal distance movement from no-load to full-load operation of the engine; the governor comprising a main governor output motor member and engine speed change responsive means connected to control movement of said member along a fixed path through said distance in opposite directions; characterized by provision on the motor member of a fluid operated motor having an output element for operating engagement with such metering means portions, said element being movable relative to the member along said path through said distance in opposite directions, first-used-fuel-failure-responsive means and motor fluid control means operated by the fuel failure responsive means and operating, in event a complete failure of the first used fuel, to cause movement of said element through said distance in one direction from an initial position on said motor member and to hold said element in said initial position until at least partial first-used-fuel-failure occurs, whereby the effective operating range of movement of the main motor member is double said distance via said element, and each position of the main motor member is indicative of engine load irrespective of which fuel may be operating the engine.

5. For use with an internal combustion engine having respective sources of two fuels and respective successively operable metering devices therefor, and wherein a first used fuel is subject to variations in a condition of that fuel which affects its ability to operate the engine under load; a hydraulic governor having a power piston movable through a predetermined distance from no load to full load metering position for either fuel, fluid-chamber-forming means carried by the power piston for movement therewith, a second piston movable in and relative to the chamber means through said distance and in the same direction as the power piston moves, means connected for operation by the second piston and adapted for successive operating connection with the engine fuel metering devices for the two fuels, hydraulic fluid pressure control means including passage means connected to supply hydraulic fluid to said chamber-forming means for movement of the second piston relative to the power piston through said distance, so that such movement of the second piston can substantially double the effective range of operation of the power piston, the control means including first fuel condition responsive means acting to maintain the second piston operating pressure of hydraulic fluid in the chamber proportional to the variations in said first fuel condition and through a pressure range adequate to move the second piston through said distance.

6. A hydraulic governor for an internal combustion engine having sources for two fuels, one subject to variations in a condition of that fuel affecting its ability to operate the engine under load, and respective metering devices for the fuels; the governor comprising speed responsive valve mechanism and a hydraulic motor controlled thereby including a power piston movable to and fro along a predetermined path a distance suitable for operating either metering device between no-fuel and full-fuel positions thereof, a fluid motor carried by the power piston for bodily movement therewith including means forming a fluid chamber, passage means to supply fluid thereto in all positions of the power piston, and a fluid operable output member adapted for successive operating connection to both metering devices, the output member being subjected to fluid in the chamber for enabling movement of the output member along said path through approximately said distance, and control means connected for operation as a function of variations in said condition of said one fuel, said control means being arranged to subject fluid in said passage means to pressures proportional to said variations beginning with a pressure sufficient to cause positioning of said output member at full-fuel during optimum engine operating capability of said one fuel.

7. A hydraulic governor for an internal combustion engine having a source of variably effective first used fuel, a second used fuel source and respective successively operable metering devices for the fuels; the governor having speed responsive valve means and hydraulic motor means controlled thereby including a power piston movable an appropriate distance in a predetermined direction for operating either metering device from a no-fuel to a full-fuel position thereof, means forming a hydraulic fluid chamber in said power piston, a second piston in said chamber and movable relative to the power piston approximately the aforesaid distance and in said direction, the second piston being adapted for successive operating connection with the metering devices of both fuels, first fuel condition responsive means having a hydraulic fluid output connected to said chamber in all positions of the power piston and acting on the second piston to tend to maintain it in first fuel metering positions relative to the power piston so long as the first fuel remains properly effective to operate the engine, and spring means operatively connected to the second piston for oppositely moving it relative to the power piston into second fuel metering positions.

8. A dual fuel engine speed governor mechanism for operating, successively and reversibly, a metering means of a first used fuel and a metering means of a second used fuel, which two means have governor output receiving portions designed for approximately equal distance movement from no-load to full-load operation of the engine; said governor mechanism comprising a main governor output motor member movable along a fixed path through said distance in opposite directions and engine speed responsive means connected to control said movement of the motor member, a fluid motor carried by said member including a metering-means-operating output element guided on the member for movement relative thereto from an initial position thereon and along said path for said distance, whereby to enable the main motor member, via said element, to have separate effective ranges of operation for the metering means of the two fuels each equal to said movement of said member, fluid conduction means operative to enable supply of fluid to the fluid motor in all positions of the main motor member and said output element, a fluid pressure source, and a fluid control valve connected thereto and to the fluid conducting means for operation of said motor element, and valve operating means arranged to be responsive to failure of the first used fuel, and operating through the valve, in event of complete failure of that fuel, to cause the motor element to move said distance on the main motor member in the proper direction to cause subsequent movements of the main motor member to become effective solely upon the metering means of the second used fuel.

9. In a hydraulic governor for internal combustion engines operable on oil and on gaseous fuel under normal working pressure at a suitable source, a hydraulic servomotor having an output element adapted for successive connection to suitable metering devices for the fuels, a speed responsive means including a valve connected to control the servomotor, permanent speed droop mechanism connected to the speed responsive means and arranged to be operated by another output element of the servomotor as a function of servomotor operation, a hydraulic motor operatingly arranged between the servomotor and one of its said output elements and having a total stroke in the direction of movement of the connected element equal to the full range gas metering output movement of the servomotor in metering gas at normal working pressure from no load to full load operation of the engine, a source of approximately constant pressure hydraulic fluid, a pressure regulator valve mechanism connected to receive fluid from said constant pressure source and having an output line connected to operate said motor, the last mentioned mechanism including a movable regulator-valve-operating displacement device exposed for operation by gas at such pressure source and operating to maintain pressure in said output line proportional to that of the gas.

10. In combination with a speed governor for an internal combustion engine capable of operating, at least part of the time, on gaseous fuel, the governor comprising a hydraulic servomechanism including speed responsive means controlling the operation of a main, engine-fuel-metering power piston, and a load limiting valve mechanism in the hydraulic fluid system of the governor connected for provisional or conditional action by the piston to limit piston stroke in one direction; a fluid operated motor connected and arranged for operating said valve mechanism in a manner to complement the provisional action of the piston to limit load, means forming a motor-operating fluid chamber connected to the motor and extending remotely of the motor, increase in pressure in the chamber acting through the motor in a direction tending to cause load limiting operation of the valve mechanism to take place, and engine-gaseous-fuel-pressure-responsive means arranged to vary the pressure of fluid in the chamber and proportionally to variations in pressure of the gaseous fuel.

11. In combination with a speed governor for an internal combustion engine capable of operating, at least part of the time, on gaseous fuel, the governor comprising a hydraulic servomechanism including speed responsive means controlling the operation of a main, engine-fuel-metering power piston, and a load limiting valve mechanism in the hydraulic fluid system of the governor connected for provisional or conditional action by the piston to limit piston stroke in one direction; a hydraulic motor connected and arranged for operating said valve mechanism in a manner to complement the provisional action of the piston to limit load, a source of approximately constant pressure hydraulic fluid, a pressure regulator valve mechanism connected to receive fluid from said source and having an output passage for regulated pressure fluid connected to said hydraulic motor for operation of it in its piston-action-complementing, load limiting, direction pursuant to rise in pressure in the passage and means operatingly connected to the pressure regulator valve mechanism and arranged to be operated to increase the hydraulic output pressure in the passage as the capability of the gaseous fuel to operate the engine increases and proportionally thereto.

12. The combination with a hydraulic governor having a governor power output hydraulic motor, a pilot valve for controlling the motor, and a governor-operating-fluid accumulator mechanism having a chamber provided with two separate motor-connected output passages at least one of which routes accumulator fluid through the pilot valve in a manner to enable the pilot valve to cause output motor movement in relatively opposite directions; characterized in that the accumulator mechanism includes an accumulator-fluid-pressure-operated valve which, until a predetermined accumulator fluid volume and pressure have become established, operates to prevent the pilot valve from causing motor movement in one direction, and, when said volume and pressures have become established, operates to enable full or two-direction control of the motor by the pilot valve.

13. Governor mechanism according to claim 12 wherein the accumulator mechanism includes a spring biased piston serving only for capacity storage of accumulator fluid, and another spring biased piston subjected to the pressure of fluid so stored, said other piston controlling accumulator spill and operating as said accumulator mechanism valve.

14. In a hydraulic speed governor for internal combustion engines, said governor comprising a servomechanism including an engine-fuel-adjusting servomotor and a pilot valve arranged to control supply of operating fluid through first and second fluid supply passages connected to respective spaces of the servomotor for effecting fuel-off and fuel-on movements thereof, wall means constituting an operating fluid accumulator the effective storage chamber of which includes a fixed wall portion and a complementary movable spring loaded wall portion of the chamber, the first supply passage being permanently connected to the chamber through the fixed wall portion thereof and the second passage being connected to the chamber by a valve controlled by the movable wall portion so as to be rendered operative, to enable supply of accumulator fluid to the servomotor through the second passage, solely by accumulator fluid action on the movable wall portion consequent upon a sufficient quantity of fluid being stored in the accumulator to enable full stroke movement of the servomotor in its fuel-off direction under the control of said pilot valve.

15. The governor mechanism according to claim 14 wherein the valve includes a spill or dump valve couple, one element of which is connected for operation by said movable wall portion and is rendered operative thereby to enable exhaust of fluid from the second passage when and after disconnection of that passage and the chamber is caused to take place by depletion of accumulated fluid in the chamber.

16. In combination with a hydraulic servomechanism including a servomotor having relatively opposed pressure spaces and respectively connected first and second supply passages, at least one of which is routed through a servomotor-controlling pilot valve, the spaces requiring predetermined amounts of supplied fluid in order to cause full stroke output movement of the servomotor in the desired directions, and an accumulator mechanism relatively fixed and movable wall portions forming an expansible storage chamber for fluid supplied thereto under pressure, the first passage being connected to a fixed wall portion of the chamber, the movable wall portion of the chamber including or comprising a spring loaded piston valve slidable in a cylinder which, during normal working operation of the servomechanism, is communicated with the second passage through a valve-port-forming-portion of that passage intersecting the cylinder between its ends, the opening of which port, by accumulator-fluid-pressure-operated movement of the piston valve, is designed to take place only when enough fluid has been stored in the accumulator to assure full stroke movement of the servomotor as supplied by the fixed-wall-connected passage, the cylinder having a spill port spaced axially from the port of the second passage, in the fluid-pressure-operated direction of movement of the piston valve, a distance enabling a cylinder-sealing land portion of the piston valve, during movement of the piston valve in the opposite direction, to close communication between the second-passage-connected port and the chamber and subsequently to unseal that port and connect it to the spill port.

17. In a hydraulic speed governor for engines, said governor having a speed-change-responsive pilot valve mechanism which controls fluid for initiating fuel-increasing and fuel-decreasing movements of a servomotor, accumulator mechanism having a continually open output fluid passage leading to the pilot valve for enabling fuel-decreasing servomotor operation thereby, the accumulator having an accumulator-fluid-pressure-operated valve controlling a second output passage between the accumulator mechanism and pilot valve for enabling fuel-increasing servomotor movement by pilot valve action, whereby the second passage is supplied with fluid at servomotor operating pressure when and only when a predetermined amount of fluid has been accumulated.

References Cited in the file of this patent
UNITED STATES PATENTS

| | | |
|---|---|---|
| 2,219,229 | Kalin | Oct. 22, 1940 |
| 2,478,183 | Drake | Aug. 9, 1949 |